July 7, 1936.  E. L. BARRETT  2,046,910
REMOTE CONTROL FOR RADIO RECEIVING SETS
Filed April 30, 1930   5 Sheets-Sheet 1

Inventor
Edward L. Barrett

July 7, 1936.  E. L. BARRETT  2,046,910
REMOTE CONTROL FOR RADIO RECEIVING SETS
Filed April 30, 1930   5 Sheets-Sheet 4

Inventor
Edward L. Barrett

Patented July 7, 1936

2,046,910

UNITED STATES PATENT OFFICE 2,046,910

REMOTE CONTROL FOR RADIO RECEIVING SETS

Edward L. Barrett, Chicago, Ill., assignor to Utah Radio Products Co., Chicago, Ill., a corporation of Illinois Application April 30, 1930, Serial No. 448,456

7 Claims. (Cl. 250—20)

REISSUED

The invention relates generally to controls for radio receiving sets, and has as its aim the provision of a device characterized by its adaptability in providing complete control of a radio receiving set from points remote from said set. The invention has general reference to that embodied in my copending application, Serial No. 327,791, filed December 22, 1928.

An object of the invention is to provide a new and improved device of this character by which the operation of a radio receiving set may be made entirely responsive, in each of its different aspects, to a control or selector element positioned at a point remote from the set.

Another object of the invention is to provide a new and improved remote control device embodying a control mechanism which is responsive, through the entire tuning range of the set, to a manually manipulated selector element located at a remote point.

A further object of the invention resides in the provision of a novel control device in which any one of a number of predetermined positions of receptive adjustment of the set may be individually and selectively designated, and embodying means for tuning the set in accordance with the designation selected.

Still another object is to provide a novel control device in which a plurality of elements are adjustable to designate a number of predetermined positions of radio reception to any one of which the set is automatically adjusted upon the designation of such position at a remote point, said device including means for optionally adjusting the set to any point not designated by one of said elements.

Another object of the invention resides in the provision of new and improved means for tuning the set either at the set or at a point remote therefrom.

Still another object is to provide a means for remotely controlling the volume of the radio receiving set.

A further object is presented by the provision of a novel means for selecting, from a remote point, a particular position to which the set is to be adjusted, and subsequently stopping the adjusting movement precisely at that position.

In connection with the foregoing objects, the invention contemplates a simple, compact arrangement of parts movable through its various operative phases by a reversible induction motor, which is interposed in the circuit to the set, all of said parts being readily accessible and adjustable as circumstances may require.

Other objects and advantages will become apparent in the following description and from the accompanying drawings, in which.

In its broad aspect, the present control device embodies a driving means for changing or adjusting the position of the movable tuning element of a radio receiving set by which the set is adjusted from one to another of its receiving positions. This driving means includes an induction motor capable of rotation in either direction, which motor is started and controlled in the extent and direction of its movement of the tuning element by means which includes a plurality of electric circuits. Said circuits are arranged to be selectively established from a point remote from the receiving set, and when energized automatically control the movement of the tuning element until said element has reached a predetermined position of adjustment. Each of said circuits includes a readily adjustable element which determines the point of receiving adjustment to which the element is moved when that particular circuit is energized. Other circuits, controllable from the remote point, permit independent adjustment of the tuning part to other points than those designated by the automatic control circuits.

The remote control device includes mechanism for adjusting the volume of the receiving set from a remote point and the entire remote control part of the device may, at the option of the operator, be disconnected to permit of unhindered and independent operation of the set in the usual manner.

The driving mechanism

In considering the present device in connection with a radio receiving set, 20 indicates generally one of the variable condensers by which receiving adjustment of the set is attained. 21 is a shaft on which the variable part of said condenser is mounted and it is customary to operate several of the condensers by the same shaft. The shaft and the moving parts associated therewith may, for the purpose of description, be termed the adjusting or "tuning" element of a radio receiving set since rotation of the shaft in one direction or the other operates in the well-known manner to adjust the set through its various stages of reception.

The adjusting mechanism for the radio receiving set in the present embodiment is in the form of a unitary, self-contained structure which may be applied or attached to an existing receiving set or may be built into the set as a part thereof during the construction of the set. To this end, the adjusting mechanism is adapted to be entirely enclosed in a suitable casing comprising (see Fig. 1) a rear wall 22 having a peripheral wall 23 defining an open front face, which is closed by a flat front wall 24 detachably secured to the side wall by screws 25. The front wall may, if desired, constitute a section of the front panel of the receiving set. Where this is the case, it is preferred to cover the wall by an ornamental escutcheon plate 26a.

The means for rotating the shaft 21 is mounted permanently in the casing and comprises a reversible induction or alternating current motor constructed in accordance with the description and disclosure of the motor shown in my copending application Serial No. 344,125, filed March 5, 1929. In mounting the motor, the rear wall 22 of the casing near one side thereof is provided with a cup-shaped, outwardly extending motor housing 26 integrally fastened thereto. The housing is of such size that the stator element 27 of the motor fits snugly therein adjacent the open face. Stop lugs 28 on the housing may be employed accurately to determine the relative positions of the parts.

A bearing shaft 29 is rigidly and non-rotatably secured to the end wall of the housing and extends inwardly thereof on the axis of the stator element. The length of the shaft 29 is determined by the distance between the end wall of the housing and the front wall 24 of the casing so that when the casing parts are assembled, the free end of the shaft 29 extends into an aperture 30 in the front wall and is flush with the outer face of the front wall. The bearing shaft 29 supports the rotor element 31 of the motor, which element preferably has an axial sleeve 32 rigid therewith for journalling the rotor element on the shaft.

It might be well to state at this point that the operation of the motor, shown herein, is induced by two sets of energizing windings or coils 33, 34 arranged, when one or the other is energized, to cause rotation of the rotor in one direction or the other.

In driving the shaft 21 by the motor, a change speed gear train is provided. Certain of the members of said train, however, are adapted to perform additional functions of operation as will hereinafter become apparent. Spaced apart from and paralleling the bearing shaft 29 is a shaft 35 rotatably journalled in the front and rear casing walls 24, 22 respectively. The shaft 35 extends both forwardly and rearwardly beyond said walls and is provided, between the ends thereof, with a pair of spaced outwardly facing shoulders 36 arranged to bear against the inner surfaces of the front and rear walls to confine the shaft against axial movement. The preferred disposition of the parts relative to the receiving set is such that the shaft 35 constitutes an axial continuation of the condenser shaft 21 with the adjacent ends of the shafts in substantial abutment. Suitable means, indicated diagrammatically at 37, drivingly connect the shafts 21 and 35. The forwardly extending end of the shaft 35 carries an indicating means, such as the pointer 38, by which the position of adjustment of the set is shown.

Internally of the casing and adjacent the rear wall 22, the shaft 35 is provided with a radially-extending rigid boss 39 (Figs. 1 and 2) to which a gear 40 of substantial diameter is secured, as by means of screws 41. The gear 40 meshes with a gear 42 mounted on a shaft 43 journalled in the front and rear casing walls. In addition to its rotatable movement, the shaft 43 is capable of limited axial movement, the extent of which movement is, in the present instance, determined by a hair-pin spring 44 arranged to engage either one of two annular grooves 45 in the shaft 43. The width of the gear 42 is ample to permit such axial movement without becoming disengaged from the gear 40. A hand piece 46, or the like, mounted on the front end of the shaft 43 facilitates manual actuation of said shaft either rotatively or axially.

The shaft 43 carries a second gear 47 which meshes with a pinion 48 rotatably supported by a small stub shaft or pin 49 extending inwardly of the casing from the front wall 24 thereof. The relation of the gear 47 to the pinion 48 is such that when the shaft 43 is in one position (herein indicated as the outer one), the gear and pinion are engaged but when the shaft is moved axially to its other or inner position, the gear moves out of engagement with the pinion. A gear 50 is connected in spaced relation to the pinion 48 as by an interposed washer 51, and the gear 50 in turn meshes with a pinion 52. The pinion 52 rotates about the rotor supporting shaft 29 as an axis and is drivingly connected to the rotor element 31 of the motor by an intermediate clutch mechanism 53.

In devices of this character, it is important that the driven adjusting movement of the receiving set be capable of being positively controlled. That is to say, the most efficient operation of the device occurs when movement of the driven parts ceases the instant that the energizing circuit to the motor is disconnected. The clutch mechanism 53 performs this function.

Figures 1, 4:
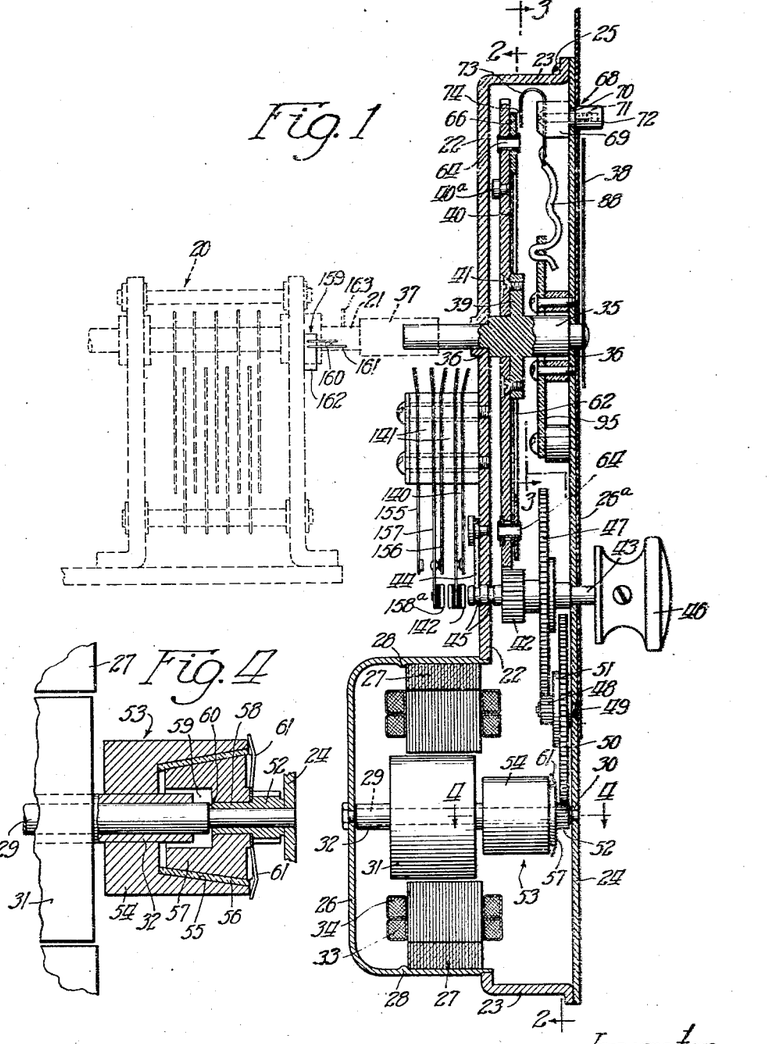
Figure 1 is a longitudinal central section taken on the lines 1—1 of Fig. 2 of a device embodying the invention, showing said device incorporated with a diagrammatically illustrated part of a radio receiving set.
Fig. 4 is a fragmentary section of a detail of the device taken on the lines 4—4 of Fig. 1.

Referring to Fig. 4, the clutch mechanism comprises a cylindrical member 54 fixed rigidly on the bearing sleeve 32 adjacent the rotor element 31. The exposed end of the member 54 has an annular counterbore 55 of substantial size formed axially therein. The side wall of the counterbore flares outwardly from the inner end thereof and is lined with a sheet of friction material 56 of a suitable character such as leather.

The complement of the clutch mechanism is in the form of a thick disk 57 preferably formed of aluminum or other light weight material mounted on an axially extending, hub-like portion 58 of the pinion 52. The outer surface of the disk is tapered to form the complement of the flaring counterbore wall so that the disk may fit into the counterbore and frictionally engage the lining 56.

The clutch disk is recessed as at 59 to receive the end of the sleeve 32 which extends into the counterbore and the outer end of the bearing shaft 29 has an outwardly facing shoulder 60 which, coacting with the front wall 24 of the casing, prevents axial movement of the clutch disk 57 and pinion 52. Resilient means, such as one or more leaf springs 61, are interposed between the disk 57 and the cylindrical member 54 normally to hold the parts in disengaged relation, as shown in Fig. 1.

Engagement of the clutch mechanism is automatically produced when an energizing circuit to the motor is established. To this end, the rotor element 31 is off-set laterally of the radial plane of the stator element 27 (see Fig. 1). Immediately upon energization of the magnetic poles of the stator element, the magnetic field induced thereby exerts a powerful force on the rotor element to move it into the radial plane of the stator element. This force readily overcomes the resistance of the resilient means 61 to effect engagement of the complementary parts of the clutch mechanism, as shown in Fig. 4. Conversely, as soon as the motor circuit is broken, the unopposed tension of the spring moves the rotor element 31 and clutch member 54 axially to disengage the clutch.

The driving connection between the motor and the set adjusting shaft 21, therefore, comprises the shaft 35 connected to the shaft 21, the gear and pinion train 40, 42, 47, 48, 50, 52 and the clutch mechanism 53. Since the resistance offered by the moving parts is ample to overcome the inertia of the moving lightweight clutch disk, the driven parts stop the instant the clutch members are disengaged. The driving connection further permits manual adjustment of the set by simply moving the finger-piece 46 and shaft 43 to carry the gear 47 out of engagement with the pinion 48. Manual rotation of the shaft 43 adjusts the shaft 21 through the intermediate gears 42, 40 and shaft 35. It will be obvious, however, that the set may be adjusted manually without disconnecting the gear 47 from the pinion 48. The provision of spaced stop lugs 22ª (Fig. 2) on the rear wall of the casing which are engageable by a stop lug 40ª on the gear 40 to confine the rotation of the gear 40 between the range limits of the condensers, is desirable.

*The automatic control means*

Figure 2:
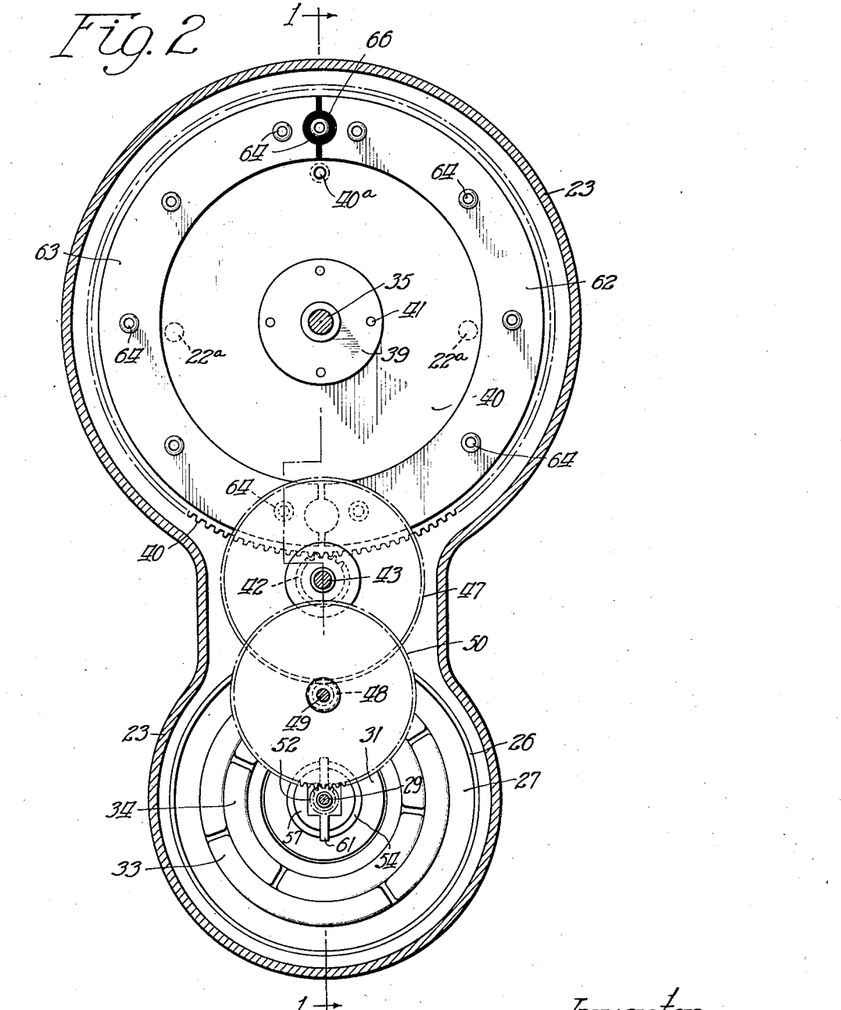
Fig. 2 is a central section taken substantially on the lines 2—2 of Fig. 1 looking, in the direction of the arrows, at the driving assembly of the device.

The control means by which the operation of the motor is initiated, the extent and direction of movement of the shaft 21 by the motor is controlled, and by which the motor is disconnected when the receiving set has been adjusted to a selected position, will now be described. With reference to Figs. 1 and 2, the gear 40 carries two similar semi-circular plates or conductor segments 62, 63 so mounted that they comprise substantially a complete ring concentric with respect to the gear axis.

The conductor segments are formed of a current conducting material and are supported in rigid and equally spaced relation to the gear by a plurality of insulating studs and washers 64. The meeting ends of the segments 62, 63 are spaced apart a short distance to provide air gaps therebetween. Preferably, one of said gaps is closed by an insulating separator 66, the exposed face of which is flush with the surfaces of the segments. This construction, therefore, presents a pair of annular, diametrically opposed current conducting surfaces which are completely insulated from each other and from the supporting gear and move in unison with the driven movement of the tuning element.

In controlling the operation of the motor, a plurality of separate electrical circuits are employed, each of which includes the motor and is completed through one or the other of the conductor segments 62 or 63. To this end, the circuits include a plurality of elements contacting the segments at spaced intervals along the periphery thereof.

Figure 3:
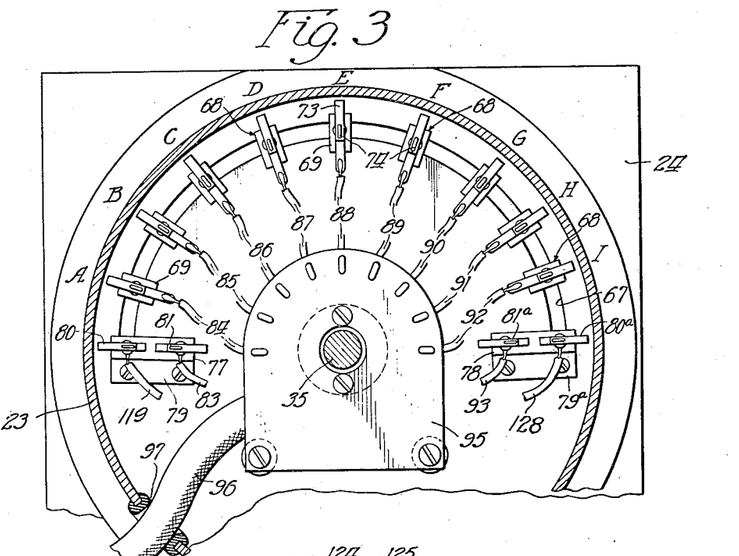
Fig. 3 is a fragmentary central section taken on the lines 3—3 of Fig. 1 looking in the opposite direction, as indicated by the arrows, at the means for predetermining the position of radio reception.
Figure 5:
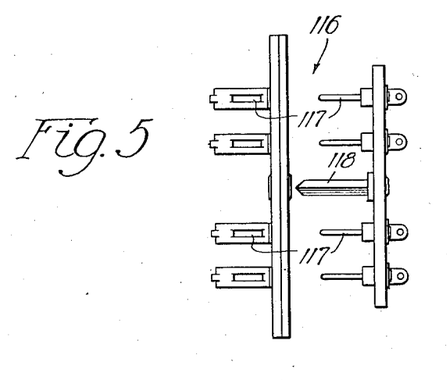
Fig. 5 is a side elevation of an element forming a part of the circuit connections.

With reference to Figs. 1 and 3, a preferred means for establishing each circuit through the conductor segments utilizes the front wall 24 of the casing as a support for the contact elements. To this end, an arcuate slot 67 is provided in the front wall, which slot is formed substantially on the radius of the conductor segments with the axis of said segments as a center. The slot extends through slightly less than 180° and preferably registers with the upper half of the ring formed by the conductor segments.

The front wall 24 carries the contact elements, generally designated 68, adjustably disposed at spaced intervals between the ends of the slot 67. Nine of the contact elements are shown herein and since they are of similar construction the description of one will apply to all. Each element comprises a small block of insulating material 69 (Fig. 1) having at one end thereof a projecting rib 70 arranged to fit snugly yet slidably in the groove 67. A screw 71 extends through the block and rib, beyond the outer face of the front wall, and is engaged by an insulated nut 72 to clamp the block rigidly to the wall.

The opposite end of the block (see Fig. 3) is grooved to receive one leg of a U shaped contact finger 73 formed of a current conducting material. If desired, the screw 71 may be employed to hold the finger in place. Preferably, the finger is formed of a somewhat resilient material and the free leg thereof is shaped to provide an outwardly extending nib 74 of less width than the width of the separator 66 which closes one of the gaps between the conductor segments. The contact nib engages the face of the adjacent conductor segment near the outer edge thereof when the parts are assembled.

In consequence of the arrangement, a plurality of separate, spaced contacts are provided which engage one or the other of the conductor segments 62, 63 depending upon the position of adjustment of the tuning element. It will be evident that the contact elements 68 may be mounted upon a separate support if desired but the present arrangement is preferred since it permits the parts to be entirely exposed by merely removing the front wall 24.

At each end of the slot 67, double-contact elements 77, 78 are rigidly fixed to the front wall. These elements comprise insulating blocks 79, 79ᵃ having spring fingers 80, 81, and 80ᵃ, 81ᵃ mounted thereon. The spring fingers are insulated from each other and are alined radially with respect to the axis of the slot. The outer spring fingers 80, 80ᵃ are positioned to engage the outer periphery of the conductor segments, as in the case of the fingers 73, while the inner fingers 81, 81ᵃ engage the inner periphery of the segments. It should be noted that the double contact elements are spaced apart circumferentially of the slot a distance less than 180°. The purpose of this spacing, as well as of the double contact elements, will become hereinafter apparent.

Separate lead wires, designated successively 84 to 92 (Figs. 3 and 9) are connected respectively to the contact fingers 73 which will hereinafter be separately designated by the letters A, B, C, D, E, F, G, H, I. The lead wires preferably extend to an insulating distributor panel 95 mounted in a relatively central position on the front wall. Adjacent the distributor panel, the lead wires are gathered together in a cable 96 which passes from the control device through an insulated aperture 97 in the side wall 23 of the housing.

*The remote selector element and control circuits*

Figures 6, 7, 8:
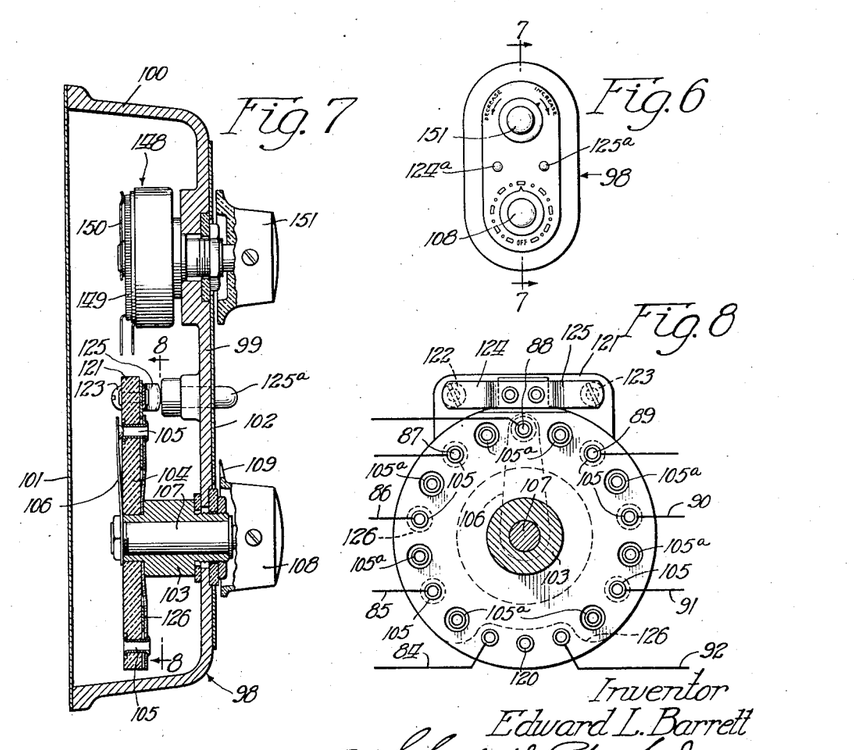
Fig. 6 is a front elevation on a diminished scale of the remotely positioned selector element.
Fig. 7 is a central section thereof taken on the lines 7—7 of Fig. 6.
Fig. 8 is a face view of the selector switch as seen from the line 8—8 of Fig. 7.

The selector element 98, by which the control circuits are established from a remote point, may be seen in Figs. 6, 7 and 8. Generally, this element comprises a relatively small elongated casing of a size which permits the element to be easily held in an operator's hand during use and which may be placed in any part of a room without appearing particularly noticeable. The casing is sectional to permit access to the interior thereof and comprises a front wall 99, side walls 100 and a back wall 101 which is detachably secured to the side wall. An escutcheon plate 102 having operating indicia thereon may be mounted upon the front wall of the casing.

Within the casing, at one end thereof is a tubular boss 103 rigidly secured to and insulated from the front wall of the casing. The inner end of the boss supports a panel 104 of insulating material, which panel is provided at regularly spaced intervals with a series of contact points 105. The contact points are arranged radially about the axis of the tubular boss 103 as a center, for selective engagement by a wiper arm 106 rigid with a shaft 107 which is rotatably mounted in the bore of the tubular boss 103. A hand piece 108, carried by the outer end of the shaft 107 facilitates rotation of said shaft, and indicating means, such as the pointer 109, designates the position of the wiper arm 106 relative to the contact points.

The cable 96 extends to the selector element and the lead wires therein are individually connected to one of the contact points 105. Preferably, as shown in Fig. 8, the contact points to which the lead wires are connected correspond in position to the respective contact elements in the control device.

It is contemplated that, on occasion, it may be desirable to disconnect the control device from the remote selector element 98. To facilitate such disconnection a jack 116 of a well known type may be interposed in the cable adjacent the receiving set, which jack has separable plug connections 117 for each of the lead wires. A central, angularly formed guide plug 118 prevents assembly of the jack in any other than one position. Several of these jacks may also be permanently located at different points remote from the set so that the selector element may be connected to the cable 96 at any of said points.

The circuits for controlling the adjustment of the receiving set to a predetermined point of reception will now be described. Referring to the wiring diagram shown in Fig. 9, a lead 110, which is common to the two energizing windings 33, 34 of the motor, is connected to a source 112 of electrical energy. This source of energy may be the same source as that which supplies power to the receiving set but it is preferred to interpose a transformer 113 between the source and the motor windings to decrease the voltage for operating the motor. Hence the lead 110 is connected to one side of the secondary coil of the transformer which, if desired, may embody a static shield 114 of any well known character. A lead wire 115 connects the other side of the secondary coil of the transformer to the wiper arm 106 in the remote selector element.

Of the double contact elements 77, 78 the inner contact fingers 81, 81ᵃ are respectively connected by the lead wires 83, 93 to the motor windings 33, 34. As has been mentioned, each of the lead wires 84 to 92 inclusive connect one of the contact fingers, A to I inclusive, with a correspondingly positioned contact point 105 on the selector switch. Selective movement, therefore, of the wiper arm 106 into engagement with one of the contact points 105 establishes a circuit to drive the motor. This circuit is completed through one or the other of the motor energizing coils 33, 34 depending upon the position of the conductor segments 62, 63 with respect to the particular circuit established.

The control device also includes a circuit which designates the "off" position of the receiving set. To this end the contact finger 80 is connected by a lead wire 119 to a contact point (herein indicated at 120). Preferably the sequential arrangement of the circuits is maintained. In calibrating the device for the "off" position the condenser shaft is moved to place the condensers at one extreme limit of movement thereof. At this position of the shaft 21 the relation of the contact fingers 80, 81 to the conductor segments 62, 63 must be such that the contact fingers engage the insulating separator 66 and are insulated thereby from either of the conductor segments.

Figure 9:
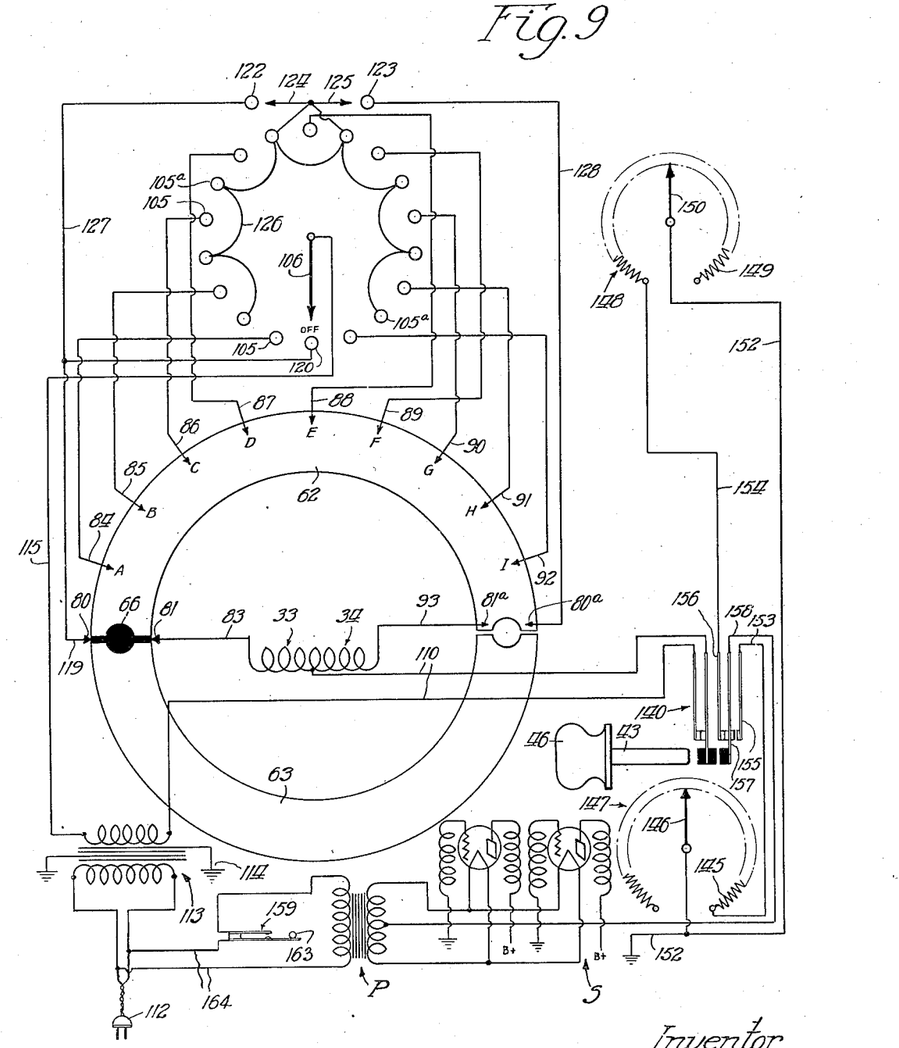
Fig. 9 is a wiring diagram illustrating the various control circuits.

As a specific example of the operation of the device, it is considered that the conductor segments are in the position shown in the wiring diagram (Fig. 9). An operator wishing to adjust the set to a particular position moves the wiper arm 106 into contact with one of the contact points 105 (for instance the one to which the lead wire 88 is connected). The particular circuit established thereby comprises the lead wire 115, wiper arm 106, lead wire 88, contact finger E, conductor segment 62, contact finger 81ᵃ, lead wire 93, motor winding 34 and lead wire 110. The motor winding 34 is the one which, upon energization thereof, drives the motor in a direction which will produce a clockwise movement of the condenser shaft 21.

Since the condenser segments also move with the shaft 21, the driven movement of the shaft continues until the separator 66 engages the contact finger E of the established circuit. This breaks the circuit and immediately stops further driven movement of the shaft 21 through the disengagement of the clutch device 53. Consequently the receiving set is accurately adjusted or tuned to the particular position indicated by the contact finger of the established circuit. As the contact elements are adjustable along the slot 67, a predetermined position of adjustment may be selected by first tuning the set for the reception of a particular transmitting station and then moving the contact element to such a position that the contact finger thereon is in engagement with the separator at that position of adjustment. In practice the arrangement is such that the pointer 38 indicates the position of the separator so that an unskilled person may easily locate the contact fingers relative to the separator by positioning said fingers at the point indicated by the pointer.

If the operator wishes to discontinue further operation of the receiving set, the wiper arm 106 is moved to establish contact with the "off" contact point 120. Inasmuch as the conductor segments are in the position shown in Fig. 2 the motor circuit established comprises the lead wire 115, wiper arm 106, contact point 120, lead wire 119, contact finger 80, conductor segment 63, contact finger 81, lead wire 83, motor winding 33, and lead wire 110. The motor therefore moves the condenser shaft 21 in a counter-clockwise direction until the "off" position (Fig. 9) is reached whereupon the circuit is broken by the engagement of the contact fingers 80, 81 with the separator 66.

Since, as has been mentioned, the opposite double contact 78, is spaced less than 180° from the contact 77, the fingers 80ª, 81ª always engage the upper conductor segment 62 when the device is in the "off" position. Upon establishing any of the circuits, therefore, the movement of the device is always away from the "off" position toward the contact element of the established circuit.

The operation of the device in moving the condenser shaft to other positions of adjustment is the same as has been described for the one position except that the circuits are established through the different contact points by the wiper arm 106. This is true even when the set is in one position of adjustment and a different position is desired. The circuit which controls the direction of movement from the old to the new position is automatically determined depending upon which conductor segment 62 or 63 is engaged by the contact finger of the newly energized circuit.

It will be evident from the foregoing that any one of a series of predetermined positions of adjustment may be selected from a remote point by merely moving the wiper arm to establish the indicated circuit for that position. The predetermined adjustments may be readily made by first ascertaining the particular transmitting stations for which the device is to be set and then correspondingly adjusting one of the contact elements. The call letters of each station may then be noted upon the escutcheon plate 102 on the remote selector element to indicate the position of the circuit for that station. Hence it is only necessary for an operator to turn the hand-piece 108 until the pointer 109 indicates the desired station and the control device automatically adjusts the receiving set accurately to receive that station.

*Independent control means*

It is foreseen in the operation of the receiving set from a remote point that the operator may wish to adjust the set to some other position than one of the indicated automatically selected positions. Thus, the control device may be set to receive a series of local stations and the operator may wish to adjust the set to receive a local or distant station, the position of adjustment of which is intermediate any of the designated stations. To permit such adjustments, an independent control means is provided, by which is meant a means which permits of remotely controlled adjustment of the receiving set to any point of reception.

Figs. 6, 7 and 8 disclose a preferred form of intermediate control means. The insulating panel 104 in the remote selector element is formed to provide a laterally extending portion 121 which in this instance underlies the central portion of the front wall of said selector element. A pair of transversely spaced contact points 122, 123 are mounted on said portion which are arranged to be optionally engaged respectively by normally spaced switch arms 124, 125 formed of a resilient material.

Suitable means for manually depressing the contact arms 124, 125 into engagement with the underlying contact points comprise headed pins 124ª, 125ª extending slidably through the front wall 99 of the selector element and bearing against the respective contact fingers.

Intermediate the contact points 105 on the panel 104, are secondary contact points 105ª which are similar to the points 105. These secondary points form a part of the circuit of the independent control means and are electrically connected together and to the switch arms 124, 125. This connection may be accomplished by an annular member 126 of current conducting material carried on the face of the panel 104 and connected to each of said secondary points 105ª and to both of the switch arms 124, 125. The switch point 122 (see the wiring diagram Fig. 9) is connected by a lead wire 127 to the wire 119 leading to the contact finger 80. The other switch arm 125 is connected by a lead wire 128 to the contact finger 80ª.

In considering the operation of the independent control means, it is presumed, as an example, that the receiving set has been adjusted to the position E. The operator, now wishing to adjust the set to some point of reception other than those designated by the automatic control circuits, moves the hand piece 108 to establish contact of the wiper arm 106 with any of the secondary contact points 105ª. The automatic control circuits are thereby disconnected and the receiving set may be optionally adjusted in one direction or the other by manipulation of the pins 124ª, 125ª. Thus, if the operator wishes to adjust the set in one direction, he depresses the pin 124ª which establishes a motor circuit through the lead wire 115, wiper arm 106, contact point 105ª, annular member 126, switch arm 124, switch point 122, lead wires 127 and 119, contact finger 80, conductor segment 63, contact finger 81, lead wire 83, motor winding 33, and lead wire 110. Similarly, if the set is to be adjusted in the opposite direction, depression of the pin 125ª establishes a like motor circuit except that the current flows now through the lead wire 128, contact finger 80ª, conductor segment 62, contact finger 81a, lead wire 93, and motor winding 34.

In each instance, the motor operates until the respective circuit is broken by releasing the pin 124a or 125a or by engagement of the separator 66 with the contact fingers on one or the other of the double contacts 77, 78. When the automatic control is to be resumed, the wiper arm 106 is moved to one of the contact points 105 and the set will be adjusted to that point automatically and irrespective of the previous position thereof.

Figure 10:
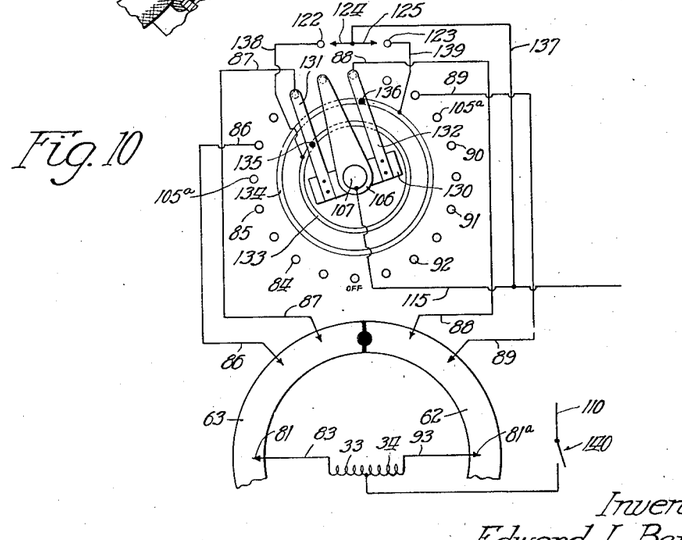
Fig. 10 is a fragmentary wiring diagram of a modified control circuit.

A modified form of independent control means is illustrated in the fragmentary wiring diagram shown in Fig. 10. This modification meets the desirability of an independent control which is limited in the extent of its adjusting movement of the receiving set to the condenser range located between any two of the predetermined positions of automatic selection.

In this construction, the contact points 105 on the panel 104 are separated from each other and from the "off" control point 120 by secondary control points 105a interposed therebetween. All of the points are regularly spaced apart on the same circumference. The shaft 107, by which the wiper arm 106 is moved, has a bar 130 of insulating material fixed rigidly thereto for rotary movement therewith. The bar 130 extends substantially perpendicularly to either side of the wiper arm 106 and each laterally extending portion has a finger 131, 132 mounted thereon. The fingers 131, 132 extend substantially parallel to the wiper arm 106 and are so spaced relative thereto that the fingers respectively engage the next adjacent contact point on either side of the point engaged by the wiper arm.

Intermediate the annular series of contact points 105, 105a and the axis of the wiper-arm shaft 107 are two annular conductor rings 133, 134 mounted on the face of the panel 104 and arranged concentrically with respect to said axis. Contact nibs 135, 136 on the fingers 131, 132 engage the conductor rings 133, 134 respectively. The fingers thus constitute sliding contacts, movable with the wiper arm 106, for connecting the conductor rings 133, 134 respectively with the contact points next adjacent the point engaged by the wiper arm.

The arrangement of the control circuits for the automatically controlled stations remains unchanged in this modification. With respect to the independent control, however, the switch arms 124, 125 are connected directly to the source of current by a lead wire 137 connected to the lead wire 115. The switch point 122 is connected by a lead wire 138 to the annular ring 133 and the other switch point 123 is connected to the annular ring 134 by a wire 139.

In the operation of this modification movement of the wiper arm 106 to establish one or another of the automatic selection circuits effects an adjustment of the receiving set to the position designated by that circuit in the normal manner. Depression of either of the pins 124a, 125a while the control element is so set has no effect since the sliding contacts 131, 132 are in engagement with unconnected secondary contact points. The operator, now wishing to effect an adjustment of the set to any position intermediate the positions designated by two adjacent automatic control circuits, moves the wiper arm into engagement with the secondary contact point located between said two stations. This engages the two sliding contact arms 131, 132 respectively with the contact points 105 which designate said two stations. Consequently depression of either of the pins 124a, 125a establishes a circuit which in effect produces the same operative movement as if the automatic control circuit had been established for the corresponding station.

As an example, it is considered that the wiper arm 106 is in engagement with the secondary contact point 105a positioned intermediate the contact points 105 to which the lead wires 87 and 88 for the contact fingers D and E are connected. Said contact points 105 are in turn respectively engaged by the sliding contacts 131, 132. Depression of the pin 125a establishes a motor circuit through leads 115 and 137, switch arm 125 and point 123, lead 139, annular ring 134, sliding contact 132, lead 88, conductor segment 62, lead 93, motor winding 34 and lead 110 which drives the condenser and conductor segments clockwise. Such movement continues, until the pin 125a is released to disconnect the circuit or until the separator 66 breaks the circuit by moving beneath the contact finger E.

Movement of the condenser shaft in opposite direction is similarly produced by the depression of the pin 124a, with the exception that the circuit established thereby proceeds through the lead 138, annular ring 133, sliding contact 131 and lead 87 to the motor winding 33. Thus, the device may be said to be universal in character since it is capable of automatically controlling the adjustment of the receiving set to any one of a number of predetermined or preselected positions and is further adapted to permit remotely controlled adjustment of the set to any other desired position of reception.

*Optional control means*

Means is provided in the present embodiment for rendering the remote control circuits inoperative when the shaft 43 is in the position for adjusting the receiving set manually. A preferred means for this purpose comprises a normally closed switch 140 in the form of a pair of elongated resilient contact elements. One of the elements is longer than the other and the elements are supported by insulating brackets 141 from the rear wall 22 of the control casing. The position of said members is such that the end of the longer element extends into the path of the axially movable shaft 43. A head 142 on said end is engageable by the end of the shaft 43 as the shaft is moved inwardly of the casing thereby opening the switch.

The switch is interposed in the lead wire 110 from the motor windings 33, 34 to the source of current. Hence, when the shaft 43 is inwardly positioned or, in other words, when the device is arranged for manual adjustment, the switch is open and the remote control circuits are inoperative. At the instant the shaft 43 is moved outwardly or to its remote control position, the switch 140 is closed and the remote control becomes operative to adjust the receiving set in accordance with the selector position then designated by the remote selector element.

*Remote volume control*

Embodied in the present device is means for controlling the volume of the receiving set from the remote selector element. This means is shown as being adapted for a receiving set in which the volume control is effected by means of a variable resistance in a well known manner. It should be understood, however, that by this disclosure it is not intended to limit the invention to a remote volume control means of this particular character.

In the wiring diagram (Fig. 9) 145 indicates the resistor element and 146 the wiper of a suitable variable resistance unit 147 incorporated as a part of the receiving set circuit designated S, for volume control at the set. The remote selector element has a similar variable resistance unit generally designated 148 (Fig. 7) mounted in the end of the casing opposite the panel 104. The unit 148 includes a resistor element 149 and wiper 150 which is actuated in the usual manner by a hand piece 151.

The variable resistance units 147 and 148 are connected in parallel with the proper circuit of the receiving set, the arrangement preferably being such that one or the other unit controls the volume of the set as determined by the arrangement of the set for manual or remote control. A satisfactory arrangement comprises a wire 152 connecting both wipers 146, 150 to the proper circuit S of the set. Lead wires 153 and 154, respectively connect the resistor elements 145 and 149 to switch elements 155, 156. A switch element 157 selectively engageable with either of said elements 155, 156 is connected by a wire 158 to the set circuit.

Referring to Fig. 1, the switch elements 155, 156 and 157 are shown as being supported by the brackets 141 which carry the remote control disconnecting switch 140. The selective switch element 157 is interposed between the other elements 155, 156 and is elongated so that a head 158a on the end is engageable by the head 142 on the switch 140. Normally, the switch element 157 contacts the element 156 to establish a volume control circuit through the remote variable resistance unit 148. Movement of the shaft 43, however, breaks this circuit and effects a contact of the element 157 with element 155 to establish a volume control circuit through the variable resistance unit 147 at the receiving set. It will be seen, therefore that the volume of the receiving set is controlled either at the set or from a remote point, and that the proper circuit is automatically determined by the position of the shaft 43.

A simple means is provided in connection with the device for controlling the flow of current to the tubes of the receiving set circuit S. This means comprises a switch 159 mounted adjacent a moving part, which switch is open only when the receiving set is in its "off" position of adjustment.

In this instance, normally contacting switch elements 160, 161 (Fig. 1) of different lengths are mounted on an insulating base 162 secured to a stationary part of one of the condensers 20. The condenser shaft 21 carries a pin 163 arranged to engage the longer of the elements and break the contact therebetween as the shaft moves into the "off" position. The switch is interposed in one of the leads 164 which connects the power pack P of the receiving set circuit S to the source of power 112. Consequently, the set is disconnected from the source of current when in its "off" position, but power becomes instantly available upon an operating movement thereof.

The simplicity of operation of a radio receiving set by the remote control device may best be seen from a general resume of the operation.

When the set is first placed in operation, a series comprising the most important transmitting stations is selected and one of the contact elements 68 is definitely located with reference to the position of the separator 66 at the position of receiving adjustment for each station. Once this is done, the elements need no further attention unless the series of stations is altered or the transmitting wave length of any station is changed.

The set is now in condition for operation, it being presumed that the shaft 43 is in its normal position for operation of the set by the remote control. The operator turns the hand piece 108 to indicate any one of the stations which he has previously selected and logged on the remote selector element and the motor drives the condensers to the position indicated by the established circuit. Subsequent movement of the hand piece to another position adjusts the set to receive that particular station or, if the "off" position is chosen, to shut-off the set.

If the operator wishes to turn the set to receive any other than one of the predetermined series of stations, the hand-piece 108 is moved to indicate contact of the wiper arm 106 with one of the secondary contacts 105a. Tuning of the set is now possible by manipulation of the pins 124a or 125a. During the remote control of the set by either the automatic or the independent means, the volume of the set may be varied as desired by rotation of the hand-piece 151.

When the operator wishes to adjust the set at the set, it is only necessary to move the shaft 43 by the hand-piece 46, which movement disengages the driving connection between the motor and the condenser shaft, disconnects the motor and the remote volume control circuits and establishes the circuit of the volume control at the set. The receiving set may then be turned in the usual manner.

While a preferred embodiment of the device has been illustrated and described, it is contemplated that various changes, alterations or modifications may be made, particularly with respect to breaking the control circuits at a preselected point to the driving connections and to the volume control, without departing from the spirit and scope of the invention as expressed in the appended claims.

I claim as my invention:

1. In a device for adjusting the tuning element of a radio receiving set, the combination of a reversible induction motor including a field, a rotor and a control circuit, means for supporting said rotor in a normal position which is laterally offset with respect to said field, said means being fashioned to permit of axial movement of said rotor into substantial alinement with said field by the force exerted when said field is energized, means for returning said rotor to said normal position immediately upon deenergization of said field, driving connections between said rotor and said tuning element including a clutch engageable when said rotor moves into alinement with said field and instantly disengageable as said rotor moves to its normal position.

2. In combination with an adjustable tuning element of a radio receiving system, means for automatically adjusting said element to one of a number of predetermined positions, means for adjusting said element independently of said automatic adjusting means, and means for confining the independently effected movement of adjustment to a range intermediate two adjacent predetermined positions.

3. In a remote control device for tuning a radio receiving system having an adjustable tuning element, the combination of a motor drivingly connected to said element and operable to move said tuning element in opposite directions, a series of motor circuits, a selector switch for establishing one of said circuits to initiate movement of said motor, an automatic switch for automatically determining the direction and extent of movement of said tuning element, auxiliary motor circuits arranged to be established by said selector switch, and manually actuated switches for starting or stopping the operation of said motor in one direction or the other from an automatically selected position of said tuning element.

4. In a remote control device for a radio receiving system, the combination of means for variably controlling the system from a remote point to adjust the reception thereof, means for variably controlling the volume of the system from a remote point, means for controlling the receptive adjustment of the system at another point, means for controlling the volume of the system at said other point, and a single selector means operable alternately to incorporate one or the other of said adjustment control means and one or the other of said volume control means in said system.

5. In combination with a radio receiving system having means for tuning the system and means for controlling the volume thereof, a remote control mechanism for tuning the set from a remote point, a volume control means for varying the volume from a remote point, and a single means for supplanting the tuning means and the volume control means of the system by the remote tuning mechanism and volume control means.

6. In a device for adjusting the tuning element of a radio receiving set, the combination of a motor including a controlling circuit therefor, means for drivingly connecting said motor to said tuning element, means movable to disengage the driving connection, two volume control means for said set including a circuit for each means, and a single means operable by the movement of said disengagement effecting means to interrupt the motor circuit and one or the other of said volume control circuits.

7. In a radio receiving system, the combination of separate means for controlling the receiving adjustment and the volume of the system at a point adjacent the system, separate means for controlling the receiving adjustment and the volume of the system at a point remote from said system, and means including a single operative member for establishing one or the other of said separate means in operative control of said system.

EDWARD L. BARRETT.